US008640759B2

(12) United States Patent  
Chen

(10) Patent No.: US 8,640,759 B2  
(45) Date of Patent: Feb. 4, 2014

(54) MOBILE PHONE FILM POSITIONER AND A MOBILE PHONE FILM WITH POSITIONING STRUCTURE

(75) Inventor: Zibin Chen, Guangdong (CN)

(73) Assignee: Jiangmen Vipo Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 13/416,418

(22) Filed: Mar. 9, 2012

(65) Prior Publication Data

US 2013/0237296 A1    Sep. 12, 2013

(51) Int. Cl.
*B29C 65/00*      (2006.01)
*H04M 1/00*      (2006.01)

(52) U.S. Cl.
USPC .......................... 156/538; 206/230; 455/575.8

(58) Field of Classification Search
USPC .................. 156/538, 391, 575, 230; 206/230; 455/899, 575.8
See application file for complete search history.

(56) References Cited

U.S. PATENT DOCUMENTS

| | | | | |
|---|---|---|---|---|
| 2,908,986 A * | 10/1959 | Grimal | ........................... | 40/710 |
| 7,784,610 B2 * | 8/2010 | Mason | ......................... | 206/230 |
| 7,957,524 B2 * | 6/2011 | Chipping | ................. | 379/428.01 |
| 8,326,383 B1 * | 12/2012 | Patel et al. | ................. | 455/575.4 |
| 8,393,377 B2 * | 3/2013 | Patel et al. | .................... | 156/538 |
| 2012/0211171 A1 * | 8/2012 | Patel et al. | .................... | 156/538 |

* cited by examiner

*Primary Examiner* — Sonny Trinh
(74) *Attorney, Agent, or Firm* — Maier & Maier, PLLC

(57) ABSTRACT

The present invention discloses a mobile phone film positioner, comprising a housing, on which a recess for accommodating a mobile phone and mobile phone film is provided, the recess is provided with positioning grooves on two ends thereof, the positioning grooves have projections on the bottoms thereof for positioning the mobile phone film; the present invention further discloses a mobile phone film with positioning structure, to be used with the mobile phone positioner described above, the protective layer of the film is provided with lugs in the corresponding positions thereof, the lugs are provided with positioning holes corresponding to the projections. The positioner and film disclosed in the present invention simplifies the positioning process between the film and screen, making the whole manipulation of film application become simple and time-saving, even the common users could finish the job easily.

4 Claims, 4 Drawing Sheets

MOBILE PHONE FILM POSITIONER AND A MOBILE PHONE FILM WITH POSITIONING STRUCTURE

TECHNICAL FIELD

Figure 1:
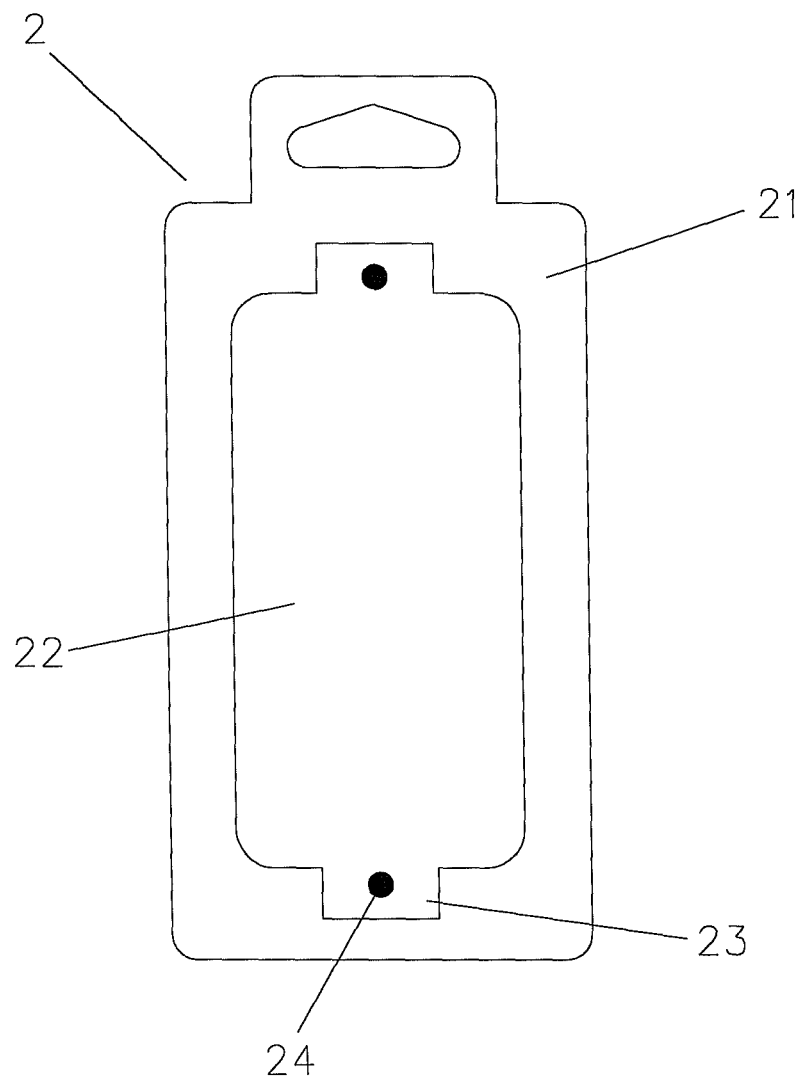

The present invention relates to a mobile phone accessory, and more particularly to a mobile phone film positioner and a mobile phone film with positioning structure used therewith.

BACKGROUND OF THE INVENTION

At present, mobile phones have been one of the most important communication tools for people in daily life, but in use the screens of the mobile phones may be easy to get scratched, impairing the display effect and appearance of the device. For this reason, people usually cover the screen of the mobile phone with a plastic-made light transmissive film, to prevent or minimize wear and tear or damage to the device. However, it is difficult for common users to achieve accurate positioning between the mobile phone film and the mobile phone screen while applying the film on the screen, thus a large amount of time is required for adjusting the relative position between the film and the screen slowly, the process is time-wasting and inconvenient.

SUMMARY OF THE INVENTION

In order to overcome the drawbacks of the existing technologies, the objective of the present invention is to provide a mobile phone film positioner and mobile phone film with positioning structure used therewith, so as to simplify the positioning procedure between the film and screen, and thus make the manipulation of film application become simpler and quicker.

The technical solution of the present invention to solve its technical problem may be described as:

A mobile phone film positioner comprises a housing, on which a recess for accommodating a mobile phone and a mobile phone film is provided; the recess is matched with the mobile phone and the mobile phone screen film in shape and size, and provided with positioning grooves on the two ends thereof respectively, wherein the positioning grooves are provided with projections on the bottoms thereof for locating the mobile phone film.

A mobile phone film with positioning structure comprises a film layer, which is matched with the mobile phone in shape and size, and covered with two film protective layers at the two sides thereof respectively, wherein at least one of the film protective layers is provided with lugs at the two ends thereof, and the lugs are provided with locating holes therein cooperating with the matched positioner for positioning.

As a further improvement of the technical solution described above, the film layer may be a light transmissive film made from Polyethylene terephthalate (PET) plastic.

As a further improvement of the technical solution described above, the film layer is provided with a bonding layer on one side thereof, and the film protective layer having the lugs on the other side thereof.

The mobile phone film positioner according to the present invention is used with a mobile phone film with positioning structure, which is disclosed in the present invention as well. To apply the film onto the screen of a mobile phone, first tear off one film protective layer from the film, and leave another one which is provided with the lugs thereon, to expose the bonding layer; place the film into the recess of the mobile phone film positioner with the film protective layer facing downwards, locate the film in the recess by aligning the lugs with the positioning grooves, and the positioning holes with the projections; place the mobile phone face-down into the recess, in this way the bonding layer of the film is in contact with the screen of the mobile phone, thus the accurate positioning between the film and the screen is achieved; finally take the mobile phone out from the recess and stroke the film to squeeze out the air therein, to complete the film application.

The beneficial effects of the present invention may include: the mobile phone film positioner and mobile phone film with positioning structure used therewith provided in the present invention simplifies the positioning or aligning process between the film and screen, and thus makes the manipulation of film application become simpler and quicker, even the common users could also finish the job easily.

EMBODIMENTS

Figure 2:
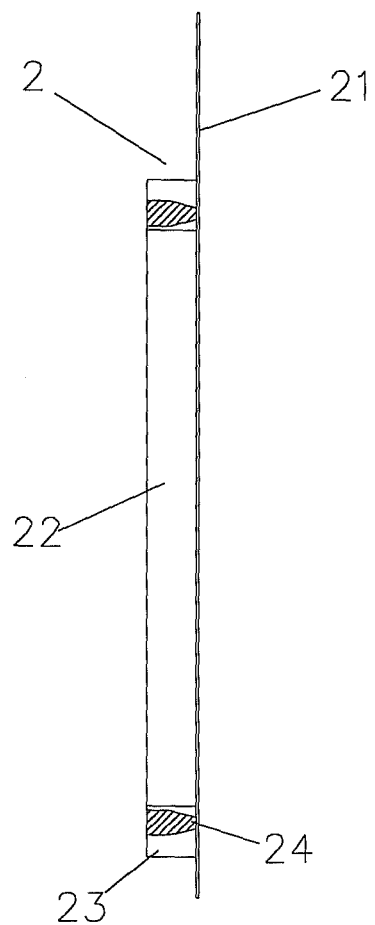
Figure 3:
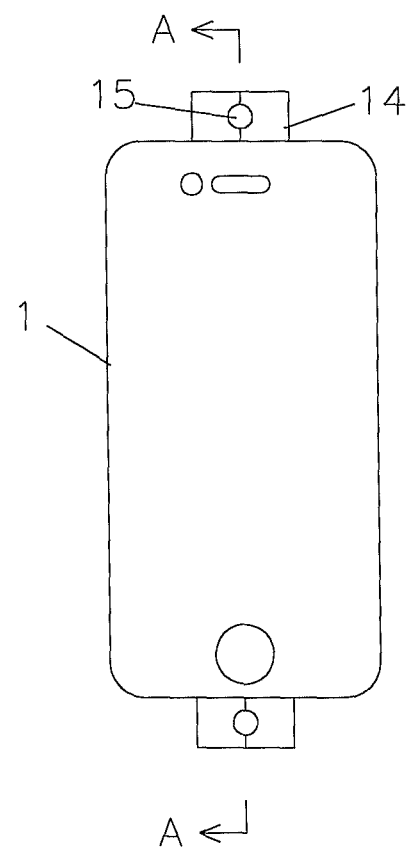
Figure 4:
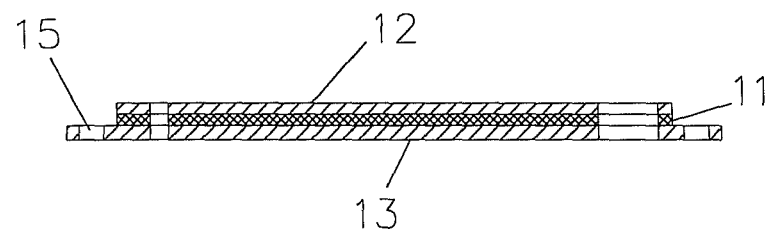
Figure 5:
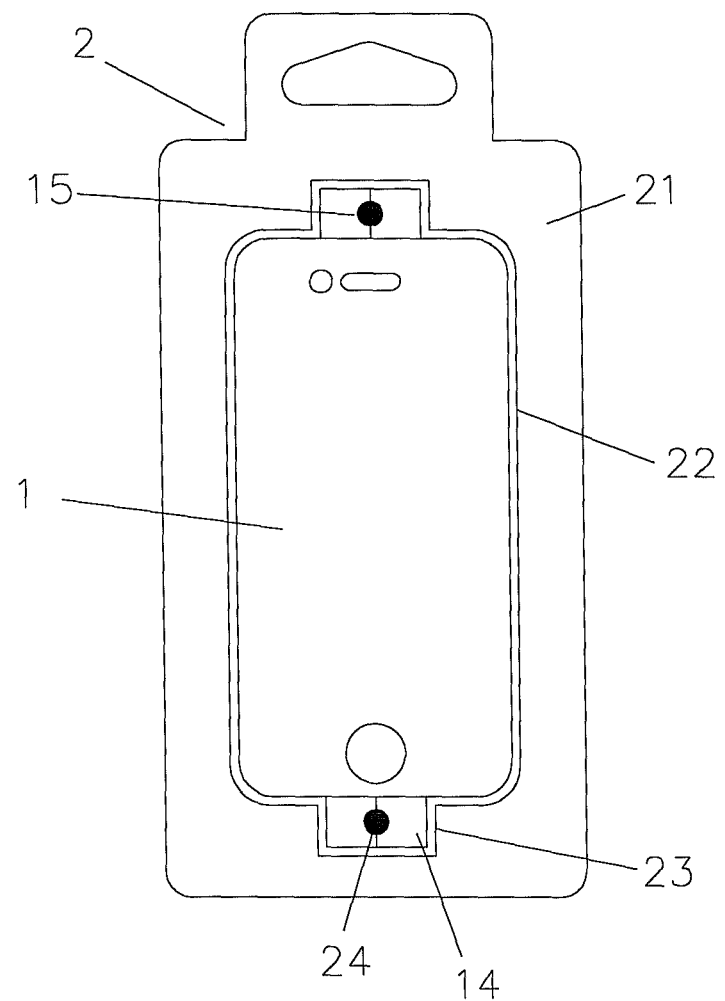

Further details and advantages of the present invention are explained using embodiments, with reference to the attached drawings. In the drawings:

FIG. 1 is a top view of the mobile phone film positioner;
FIG. 2 is a side view of the mobile phone film positioner;
FIG. 3 is a top view of the mobile phone film with positioning structure;
FIG. 4 is a sectional view of the mobile phone film positioner along the line A-A in FIG. 3;
FIG. 5 is a schematic view of the mobile phone film positioner and the mobile phone film with positioning structure in combination.

EMBODIMENTS

As shown in FIGS. 1 and 2, the mobile phone film positioner 2 disclosed by the present invention comprises a housing 21, on which a recess 22 for accommodating the mobile phone and the mobile phone film is provided, the recess 22 is configured to match the mobile phone and mobile phone film in shape and size. In addition, the recess 22 is provided with two positioning grooves 23 at the two ends thereof respectively, and each positioning groove 23 is provided with a projection 24 on the bottom thereof.

As shown in FIGS. 3 and 4, the present invention further discloses a mobile phone film 1 with positioning structure, to be used with the positioner 2 described above. The film 1 comprises a film layer 11, which is made from PET plastic and matched with the mobile phone in shape and size, at one side thereof the film layer 11 is provided with a bonding layer which may be an adhesive layer preferably. The film layer 11 is further provided with two film protective layers 12, 13 at both the sides thereof respective, wherein the film protective layer 13 at the side of the film layer 11 opposite to the side on which the bonding layer is provided, is provided with two lugs 14, wherein the lugs 14 are matched with the positioning groove 23 in shape, and provided with two positioning holes 15 matched with the projections 24.

As shown by FIG. 5, the mobile phone film positioner 2 is used in conjunction with the mobile phone film 1 with positioning structure, to apply the film on the screen, first tear off the film protective layer 12 from the film 1 and leave the one 13 which is provided with the lugs, to expose the bonding layer of the film 11; place the film 1 into the recess 22 of the mobile phone film positioner 2 with the film protective layer 13 facing downwards, locate the film 1 in the recess 22 by aligning the lugs 14 with the positioning grooves 23, and the positioning hole 15 with the projections 14; place the mobile phone face-down into the recess 22, in this way the bonding layer of the film 1 is in contact with the screen of the mobile phone, thus the accurate positioning between the film and the screen is achieved; finally take the mobile phone out of the recess 22 and stroke the film 1 to remove the air bubbles therein, to complete the film application. The whole process is simple and time-saving; even a common user could finish the job easily.

Furthermore, in order to reduce the residual air in the film, it is also possible to place one end of the mobile phone into the recess 22 first, and then place the whole mobile phone into the recess 22 obliquely and slowly, to minimize the number of the air bubbles therein.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structure.

What is claimed is:

1. A mobile phone film positioner, comprising:
    a housing, on which a recess for accommodating a mobile phone and a mobile phone film is provided,
    the recess being matched with the mobile phone and the mobile phone film in shape and size,
    and provided with positioning grooves on the two ends thereof respectively, the positioning grooves being provided with projections on the bottoms thereof respectively for locating the mobile phone film and formed in the shape of lugs on a film layer, wherein the projections act to receive locating holes formed on a film layer by the lugs.

2. A mobile phone film with positioning structure, comprising:
    a film layer matched with the mobile phone in shape and size, the film layer being covered with two film protective layers at the two sides thereof respectively, wherein at least one of the film protective layers is provided with lugs at the two ends thereof, the lugs matched in shape to positioning grooves on a mobile phone film positioner and provided with locating holes therein cooperating with the matched positioner for positioning.

3. The mobile phone film with positioning structure according to claim 2, wherein the film layer is a light transmissive film made from Polyethylene terephthalate (PET) plastic.

4. The mobile phone film with positioning structure according to claim 3, wherein the film layer is provided with a bonding layer on one side thereof, and the film protective layer having the lugs on the other side thereof.

* * * * *